3,016,387
6-FLUORO ANDROSTANES
John C. Babcock and J Allan Campbell, Kalamazoo Township, Kalamazoo County, Milton E. Herr, Kalamazoo, John A. Hogg, Kalamazoo Township, Kalamazoo County, and Raymond L. Pederson, Charleston Township, Kalamazoo County, Mich., assignors to The Upjohn Company, Kalamazoo, Mich., a corporation of Delaware
No Drawing. Filed Sept. 28, 1959, Ser. No. 842,570
14 Claims. (Cl. 260—397.3)

This invention relates to novel 6α- and 6β-fluoro steroids and is more particularly concerned with 6-fluoro-17α-alkyl-17β-hydroxyandrostan-3-ones and the 17-acylates thereof, 6-fluoro-17α-alkyl-17β-hydroxy-19-norandrostan-3-ones and the 17-acylates thereof, 6-fluoro-17α-alkyl-3,17β-dihydroxyandrostanes and the 17-acylates thereof, 6-fluoro-17α-alkyl-3,17β-dihydroxy-19-norandrostanes and the 17-acylates thereof, represented by Formula IA below, and 6-fluoro-17β-hydroxyandrostan-3-ones, 6-fluoro-17β-hydroxy-19-norandrostan-3-ones, 6-fluoro-17β-hydroxyandrostane-3,11-diones, 6-fluoro-17β-hydroxy-19-norandrostane-3,11-diones, 6-fluoro-11β,17β-dihydroxyandrostan-3-ones, 6-fluoro-11β,17β-dihydroxy-19-norandrostan-3-ones, the 17-acylates thereof, 6-fluoroandrostane-3,17-diones, 6-fluoro-19-norandrostane-3,17-diones, 6-fluoroandrostane-3,11,17-triones, 6-fluoro-19-norandrostane-3,11,17-triones, 6-fluoro-11β-hydroxyandrostane-3,17-diones, 6-fluoro-11β-hydroxy-19-norandrostane-3,17-diones, 6-fluoro-3,17β-dihydroxyandrostanes, 6-fluoro-3,17β-dihydroxy-19-norandrostares, 6-fluoro-3,17β-dihydroxyandrostan-11-ones, 6-fluoro-3,17β-dihydroxy-19-norandrostan-11-ones, 6-fluoro-3,11β,17β-trihydroxyandrostanes, 6-fluoro-3,11β,17β-trihydroxy-19-norandrostanes, the 17-acylates thereof, 6-fluoro-3-hydroxyandrostan-17-ones, 6-fluoro-3-hydroxy-19-norandrostan-17-ones, 6-fluoro-3-hydroxyandrostane-11,17-diones, 6-fluoro-3-hydroxy-19-norandrostane-11,17-diones, 6-fluoro-3,11β-dihydroxyandrostan-17-ones, and 6-fluoro-3,11β-dihydroxy-19-norandrostan-17-ones, represented by Formula IB below, and intermediates and methods used in the preparation thereof.

In this application the wavy line ( $\S$ ) appearing at the 6-position, in the formulae below, is a generic expression including the alpha (α) and beta (β) configuration. Furthermore, when the term "androstan" or "androstane" is not preceded by the symbol "5α" or "5β" it is meant to be a generic term inclusive of the 5α and 5β configuration.

Some of the novel compounds of this invention are represented by the formula:

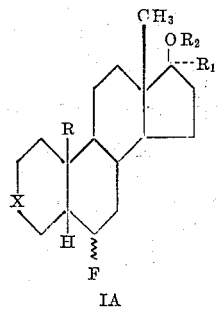

IA wherein R is methyl or hydrogen, $R_1$ is an alkyl radical of from one to six carbon atoms, inclusive, e.g., methyl, ethyl, propyl, butyl, amyl, hexyl, isopropyl, 3-methylpentyl, and the like, $R_2$ represents hydrogen or an acyl radical of an organic carboxylic acid, particularly a hydrocarbon carboxylic acid, containing from one to twelve carbon atoms, inclusive, and X is a radical selected from the group consisting of the carbonyl radical (>C=O) and the hydroxymethylene radical (>CHOH).

The compounds of Formula IA possess useful therapeutic properties. They possess the ability to modify the secretion of gonadotropins and in addition exhibit androgenic, anabolic, anti-osteoporotic, and central nervous system regulating activity. They are thus useful in the treatment of debilitated, osteoporotic and hypogonadal conditions.

Administration of the steroids of Formula IA can be in conventional dosage forms such as pills, tablets, capsules, syrups, or elixirs for oral use, or in liquid forms which are adaptable to the natural and synthetic steroid hormones for injectable products.

The novel compounds of Formula IA can be prepared in accordance with the following reaction scheme:

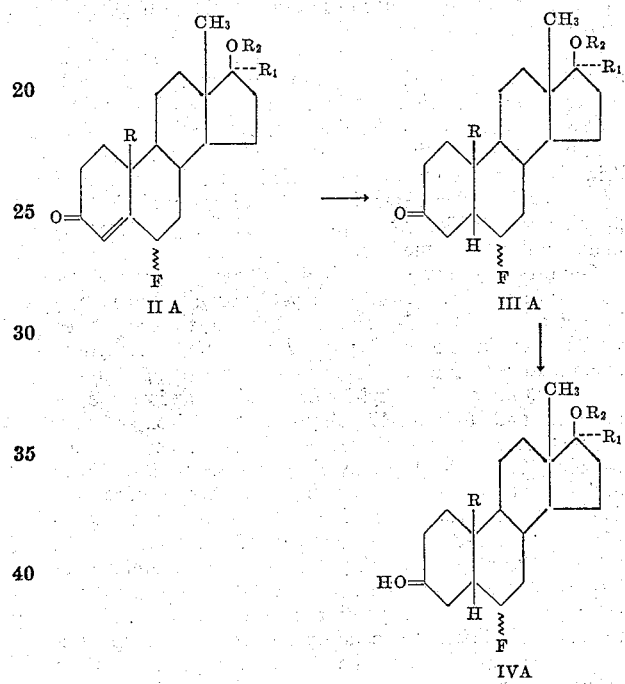

wherein R, $R_1$ and $R_2$ have the same meaning as previously given.

The starting steroids for the preparation of the compounds of Formula IA are, for example, 6-fluoro-17α-alkyl-17β-hydroxy-4-androsten-3-ones and the 17-acylates thereof and 6-fluoro-17α-alkyl-17β-hydroxy-19-nor-4-androsten-3-ones and the 17-acylates thereof, disclosed in copending application Serial No. 699,502, filed November 29, 1957, now U.S. Patent 2,838,500, granted June 10, 1958.

The process for the preparation of the compounds of Formula IA comprises catalytically hydrogenating compounds of the type represented by Formula IIA, for example, 6-fluoro-17α-alkyl-17β-hydroxy-4-androsten-3-ones and the 17-acylates thereof and 6-fluoro-17α-alkyl-17β-hydroxy-19-nor-4-androsten-3-ones and the 17-acylates thereof, to obtain the compounds of Formula IIIA, for example, 6-fluoro-17α-alkyl-17β-hydroxyandrostan-3-ones and the 17-acylates thereof and 6-fluoro-17α-alkyl-17β-hydroxy-19-norandrostan-3-ones and the 17-acylates thereof, respectively.

The catalytic hydrogenation of the compounds of Formula IIA to produce the compounds of Formula IIIA is accomplished by treating the compounds of Formula IIA with hydrogen in the presence of a noble metal catalyst, for example, palladium, rhodium, and the like, preferably palladium. The noble metal catalyst can be supported on a carrier, for example, charcoal, alumina, zeolite, zinc oxide, and the like. The reaction can be carried out at pressures of from atmospheric pressure to 100 pounds per square inch gauge, preferably at pressures between five and fifteen pounds per square inch gauge. The hydrogenation reaction is preferably carried out in the presence of a solvent, such as an organic solvent, for example, isopropyl alcohol, 95 percent ethyl alcohol, tertiary butyl alcohol, acetone, methyl ethyl ketone, dioxane, ethyl acetate, and the like, or an alcohol, for example, ethyl alcohol, containing ten percent by volume of a 5 N solution of an aqueous acid, for example, hydrochloric acid, hydrobromic acid, sulfuric acid and the like.

The thus-obtained compounds of Formula IIIA are then reduced with a metal hydride, for example, lithium aluminum hydride or a metal borohydride, preferably an alkali-metal borohydride, for example, sodium borohydride, in a solvent which does not react readily with the reducing agent, to produce the compounds of Formula IVA, for example, 6-fluoro-17α-alkyl-3,17β-dihydroxyandrostanes and the 17-acylates thereof and 6-fluoro-17α-alkyl-3,17β-dihydroxy-19-norandrostanes and the 17-acylates thereof. When lithium aluminum hydride is used, the reaction is carried out in the presence of an ether-type solvent, for example, dioxane, ethyl ether, tetrahydrofuran, and the like. When an alkali-metal borohydride is used, the reaction is carried out in the presence of an alcohol, for example, methanol, ethanol, isopropanol, and the like, or in the presence of pyridine, dimethylaniline, and the like.

6-fluoro-17α-alkyl-3,17β-dihydroxyandrostanes and 6-fluoro-17α-alkyl-3,17β-dihydroxy-19-norandrostanes can be acylated at the 3-position according to procedures well known in the art for the 3-acylation of dehydroepiandrosterone and 17α-methyl-5-androstene-3β,17β-diol to give 6-fluoro-17α-alkyl-3,17β-dihydroxyandrostane 3-acylates and 6-fluoro-17α-alkyl-3,17β-dihydroxy-19-norandrostane 3-acylates, respectively. The 3-acylation of 6-fluoro-17α-alkyl-3,17β-dihydroxyandrostane 17-acylates and 6-fluoro-17α-alkyl-3,17β-dihydroxy-19-norandrostane 17-acylates is productive of the corresponding 6-fluoro-17α-alkyl-3,17β-dihydroxyandrostane 3,17-diacylates and 6-fluoro-17α-alkyl-3,17β-dihydroxy-19-norandrostane 3,17-diacylates. When the 3,17-diacylate is produced the ester groups at the 3-position and the 17-position are the same or different depending on the ester group present at the 17-position of the starting compound and the esterifying agent used to effect esterification at the 3-position. The 3-acylates of 6-fluoro-17α-alkyl-3,17β-dihydroxyandrostanes (and the 17-acylates thereof) and 6-fluoro-17α-alkyl-3,17β-dihydroxy-19-norandrostanes (and the 17-acylates thereof) possess the same activities as the parent compounds. In addition, the 3-acylates characteristically possess greater oil solubility and a more extended duration of activity than their parent compounds.

Still other novel compounds of this invention are represented by the formula:

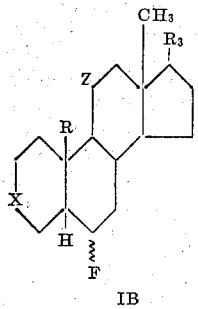

IB wherein R and X have the same meaning previously given, R₃ represents hydroxyl, OAcyl or keto, and Z represents hydrogen, hydroxyl or keto. The term Acyl as used herein refers to an acyl radical of an organic carboxylic acid, preferably a hydrocarbon carboxylic acid, containing from one to twelve carbon atoms, inclusive.

The compounds of Formula IB possess useful therapeutic properties. They possess androgenic and anabolic activity and in addition exhibit antiestrogenic, antiosteoporotic, gonadotropin inhibiting and central nervous system regulating activity and are accordingly useful in the treatment of debilitated, osteoporotic, and hypogonadal conditions.

Administration of the steroids of Formula IB can be in conventional dosage forms, such as pills, tablets, capsules, syrups or elixirs for oral use, or in liquid forms which are adaptable to the natural and synthetic steroid hormones for injectable products.

The novel steroids of Formula IB can be prepared according to the following reaction sequence:

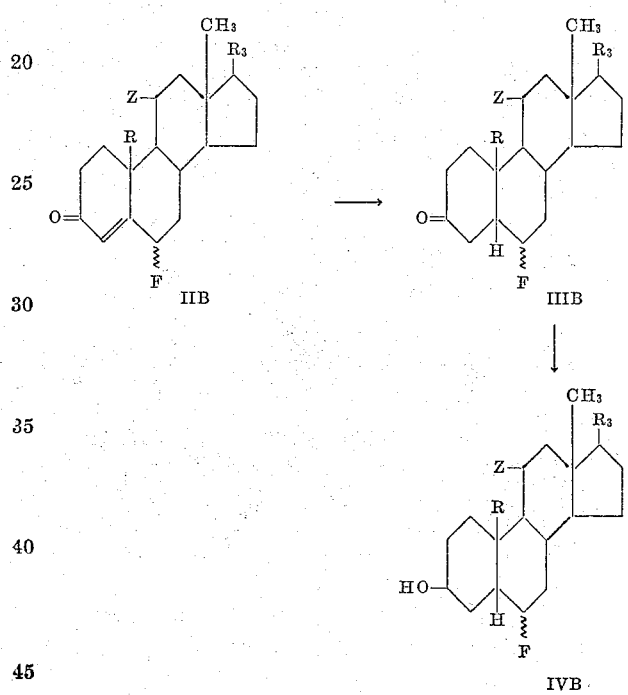

wherein R, R₃ and Z have the same meaning as previously given.

The starting steroids for the preparation of the compounds of Formula IB are, for example, 6-fluoro-17β-hydroxy-4-androsten-3-ones, 6-fluoro-17β-hydroxy-19-nor-4-androsten-3-ones, 6-fluoro-17β-hydroxy-4-androstene-3,11-diones, 6-fluoro-17β-hydroxy-19-nor-4-androstene-3,11-diones, 6-fluoro-11β,17β-dihydroxy-4-androsten-3-ones, 6-fluoro-11β,17β-dihydroxy-19-nor-4-androsten-3-ones, the 17-acylates thereof, 6-fluoro-4-androstene-3,17-diones, 6-fluoro-19-nor-4-androstene-3,17-diones, 6-fluoro-4-androstene-3,11,17-triones, 6-fluoro-19-nor-4-androstene-3,11,17-triones, 6-fluoro-11β-hydroxy-4-androstene-3,17-diones, and 6-fluoro-11β-hydroxy-19-nor-4-androstene-3,17-diones, disclosed in copending application Serial No. 716,026, filed February 19, 1958, now U.S. Patent 2,838,492, granted June 10, 1958.

The process for the preparation of the compounds of Formula IB comprises catalytically hydrogenating compounds of the type represented by Formula IIB, for example, 6-fluoro-17β-hydroxy-4-androsten-3-ones, 6-fluoro-17β-hydroxy-19-nor-4-androsten-3-ones, 6-fluoro-17β-hydroxy-4-androstene-3,11-diones, 6-fluoro-17β-hydroxy-19-nor-4-androstene-3,11-diones, 6-fluoro-11β,17β-dihydroxy-4-androsten-3-ones, 6-fluoro-11β,7β-dihydroxy-19-nor-4-androsten-3-ones, the 17-acylates thereof, 6-fluoro-4-androstene-3,17-diones, 6-fluoro-19-nor-4-androstene-3,17-diones, 6-fluoro-4-androstene-3,11,17-triones, 6-fluoro-19-nor-4-androstene - 3,11,17 - triones, 6-fluoro-11β-hydroxy-4-androstene-3,17-diones, and 6-fluoro-11β-hydroxy-19-nor-4-androstene-3,17-diones, to obtain the compounds of Formula IIIB, for example, 6-fluoro-17β-hydroxyandrostan-3-ones, 6-fluoro - 17β-hydroxy-19-nor-androstan-3-ones, 6-fluoro - 17β - hydroxyandrostane-3,11-diones, 6-fluoro - 17β - hydroxy-19-norandrostane-3,11-diones, 6 -fluoro - 11β,17β - dihydroxyandrostan -3 - ones, 6 - fluoro - 11β,17β-dihydroxy-19-norandrostan-3-ones, the 17 - acylates thereof, 6 - fluoroandrostane - 3,17 - diones, 6-fluoro-19-norandrostane-3,17-diones, 6-fluoroandrostane-3,11,17-triones, 6-fluoro-19-norandrostane-3,11,17-triones, 6-fluoro-11β-hydroxyandrostane-3,17-diones, and 6-fluoro-11β-hydroxy-19-norandrostane-3,17 - diones, respectively.

The catalytic hydrogenation of the compounds of Formula IIB to produce the compounds of Formula IIIB is accomplished by treating the compounds of Formula IIB with hydrogen in the presence of a noble metal catalyst, for example, palladium, rhodium, and the like, preferably palladium. The noble metal catalyst can be supported on a carrier, for example, charcoal, alumina, zeolite, zinc oxide, and the like. The reaction can be carried out at pressures of from atmospheric pressure to 100 pounds per square inch gauge, preferably at pressures between five and fifteen pounds per square inch gauge. The hydrogenation reaction is preferably carried out in the presence of a solvent, such as an organic solvent, for example, isopropyl alcohol, 95 percent ethyl alcohol, tertiary butyl alcohol, acetone, methyl ethyl ketone, dioxane, ethyl acetate and the like, or an alcohol, for example, ethyl alcohol, containing ten percent by volume of a 5 N solution of an aqueous acid, for example, hydrochloric acid, hydrobromic acid, sulfuric acid, and the like.

The thus obtained compounds of Formula IIIB are then subjected to a reduction reaction, using one to 1.5 equivalents of sodium or potassium borohydride (although somewhat lesser or greater amounts of the borohydride are operative), to convert them to the compounds of Formula IVB, for example, 6-fluoro-3,17β-dihydroxyandrostanes, 6-fluoro-3,17β - dihydroxy - 19 - norandrostanes, 6-fluoro-3,17β-dihydroxyandrostan - 11 - ones, 6 - fluoro-3,17β-dihydroxy-19-norandrostan-11-ones, 6-fluoro - 3,11β,17β-trihydroxyandrostanes, 6-fluoro - 3,11β,17β - trihydroxy-19-norandrostanes, the 17-acylates thereof, 6-fluoro-3-hydroxyandrostan-17-ones, 6-fluoro-3-hydroxy-19-norandrostan-17-ones, 6-fluoro-3-hydroxyandrostane-11,17-diones, 6-fluoro-3-hydroxy-19-norandrostane-11,17 - diones, 6-fluoro-3,11β-dihydroxyandrostan - 17 - ones, and 6 - fluoro-3,11β-dihydroxy - 19-norandrostan - 17-ones, respectively. The reduction of the compounds of Formula IIIB is carried out in the presence of an organic solvent, for example, methanol, ethanol, isopropanol, pyridine, dimethylaniline, and the like, at a temperature of between minus ten and plus ten degrees centigrade, although somewhat higher or lower temperatures are operative. Preferably, the reduction reaction is carried out in the presence of a small amount of alkali.

6 - fluoro - 3,17β-dihydroxyandrostanes, 6-fluoro-3,17β-dihydroxy-19-norandrostanes, 6-fluoro - 3,17β-dihydroxyandrostan-11-ones, 6-fluoro-3,17β-dihydroxy-19-norandrostan-11-ones, 6-fluoro - 3,11β,17β - trihydroxyandrostanes, 6-fluoro-3,11β,17β-trihydroxy-19-norandrostanes, 6-fluoro-3-hydroxy - androstan - 17 - ones, 6-fluoro-3-hydroxy-19-norandrostan-17 - ones, 6-fluoro - 3 - hydroxyandrostane-11,17-diones, 6-fluoro-3-hydroxy-19-norandrostane-11,17-diones, 6-fluoro-3,11β-dihydroxyandrostan-17-ones, and 6-fluoro-3,11β-dihydroxy-19-norandrostan-17-ones can be converted to their corresponding 3-acylates according to procedures well known in the art for the 3-acylation of dehydroepiandrosterone and 17α-methyl-5-androstene-3β,17β-diol. The 3-acylation of 6-fluoro-3,17β-dihydroxyandrostane 17-acylates, 6-fluoro-3,17β-dihydroxy-19-norandrostane 17-acylates, 6-fluoro - 3,17β - dihydroxyandrostan-11-one 17-acelates, 6-fluoro-3,17β-dihydroxy-19-norandrostan-11-one 17-acylates, 6-fluoro-3,11β,17β-trihydroxyandrostane 17-acylates and 6-fluoro-3,11β,17β-trihydroxy-19-norandrostane 17-acylates is productive of their corresponding 3,17-diacylates. When the 3,17-diacylate is produced the ester groups at the 3-position and the 17-position are the same or different depending on the ester group present at the 17-position of the starting steroid and the esterifying agent used to effect esterification at the 3-position. The 3-acylates of the parent compounds (the compounds of Formula IVB) possess the same activities as the parent compounds. In addition, the 3-acylates characteristically possess greater oil solubility and a more extended duration of activity than their parent compounds.

The foregoing compounds of Formulae IA, IIA, IIIA, and IVA (Formula IA being a composite of Formulae IIIA and IVA) and IB, IIB, IIIB and IVB (Formula IB being a composite of Formulae IIIB and IVB) are all characterized by the presence of a 6-fluoro substituent. It should be noted that the configuration of the fluorine at the 6-position can be either 6α or 6β. Thus, substituting a 6β-fluoro steroid as the starting material and following the procedures hereinbefore described and as exemplified below, there is produced as the final product of each example the corresponding 6β-epimer. Where 6β-epimer or a mixture predominating therein is employed as the starting material, any subsequent reaction product can be isolated either as 6β-epimer or the aforesaid mixture of 6α- or 6β-epimers.

The following examples are illustrative of the process and products of the present invention, but are not to be construed as limiting.

In the examples which follow, the Roman numeral following the name of a compound is used to indicate the relation of the compound to the reaction schemes depicted and described above.

EXAMPLE 1

*6α-fluoro-17α-methyl-17β-hydroxyandrostan-3-ones (IIIA)*

A mixture containing 5.8 grams of 6α-fluoro-17α-methyl-17β-hydroxy-4-androsten-3-one, 270 milliliters of isopropyl alcohol and 3.5 grams of five percent palladium on charcoal is hydrogenated at fifteen pounds per square inch gauge. The reaction mixture thus obtained is filtered and concentrated to dryness, leaving a residue. The residue is taken up in seventy milliliters of methylene chloride and chromatographed over 200 grams of Florisil (synthetic magnesium silicate). The chromatographic column is eluted with 230-milliliter fractions as follows:

Fractions:
1–24 _____ Ether: Skellysolve B hexanes::1:4.
25–52 _____ Ether: Skellysolve B hexanes::1:3.

Fractions 26–52 are combined and the solvent is evaporated therefrom to give 1.25 grams of a crude residue which is recrystallized from an ether-Skellysolve B hexanes mixture to give 0.77 gram of 6α-fluoro-17α-methyl-17β-hydroxy-5β-androstan-3-one (IIIA) melting at 150 to 151 degrees centigrade and having an [α]$_D$ of minus nine degrees in ethanol and the following analysis:

*Anal.*—Calculated for $C_{20}H_{31}FO_2$: C, 74.49; H, 9.69; F, 5.89. Found: C, 74.39; H, 9.70; F, 5.34.

6α-fluoro-17α-methyl - 17β - hydroxy-5α-androstan-3-one (IIIA), melting at 165–9° C., is present in the crystallization mother liquors and can be isolated by additional chromatography followed by crystallization from ether-Skellysolve B hexanes mixture.

Alternatively, the two isomers can be separated by reaction of the crude residue mixture from the hydrogenation with three milliliters of pyrrolidine in 25 milliliters of methanol at reflux temperature and under an atmosphere of nitrogen for about two minutes. The 3-pyrrolidyl enamines of the 5α and 5β compounds thus formed are then separated by crystallization. The first crop of crystals of the 3-pyrrolidyl enamine which forms is removed, and is dissolved by adding thereto 200 milliliters of methanol containing ten milliliters of ten percent sodium hydroxide solution and warming under a nitrogen atmosphere at approximately fifty degrees centigrade for about twenty minutes. The mother liquor, containing the remaining 3-pyrrolidyl enamine, which is left following removal of the first crop of crystals, has added thereto 175 milliliters of methanol containing ten milliliters of ten percent sodium hydroxide solution followed by warming at approximately fifty degrees centigrade under a nitrogen atmosphere for about twenty minutes. The solutions are then cooled, neutralized with acetic acid and concentrated to near dryness under reduced pressure. The residues thus obtained are extracted with ether and the ether extract is washed, dried, and evaporated to dryness. Crystallizations from acetone-Skellysolve B hexanes give the pure 5α and 5β isomers, 6α-fluoro-17α-methyl-17β-hydroxy-5α-androstan-3-one and 6α-fluoro-17α-methyl-17β-hydroxy-5β-androstan-3-one, respectively.

Similarly, substituting other 6α-fluoro-17α-alkyl-17β-hydroxy-4-androsten-3-ones, for example, 6α-fluoro-17α-ethyl-17β-hydroxy-4-androsten-3-one, for 6α-fluoro-17α-methyl-17β-hydroxy-4-androsten-3-one is productive of other 6α-fluoro-17α-alkyl-17β-hydroxy - 5β - androstan-3-ones and 6α-fluoro-17α-alkyl-17β-hydroxy-5α-androstan-3-ones, for example, 6α-fluoro-17α-ethyl-17β-hydroxy-5β-androstan-3-one and 6α-fluoro-17α-ethyl-17β-hydroxy-5α-androstan-3-one.

Likewise, substituting 6α-fluoro - 17α - methyl-17β-hydroxy-4-androsten-3-one 17-acylates and other 6α-fluoro-17α-alkyl-17β-hydroxy-4-androsten-3-one 17-acylates for 6α-fluoro - 17α-methyl-17β-hydroxy-4-androsten-3-one is productive of 6α-fluoro-17α-methyl-17β-hydroxy-5β-androstan-3-one 17-acylates (and the 5α-epimers thereof), and other 6α-fluoro-17α-alkyl-17β-hydroxy-5β-androstan-3-one 17-acylates (and the 5α-epimers thereof). Representative of the 17-acylates thus produced are the 17-acetate, 17-propionate, 17-butyrate, 17-valerate, 17-hexanoate, 17-laurate, 17-trimethylacetate, 17-isobutyrate, 17-isovalerate, 17-cyclohexane-carboxylate, 17-benzoate, 17-phenylacetate, 17-β-phenylpropionate, 17-(o-, m-, p-toluate), 17-hemisuccinate and 17-hemiadipate.

EXAMPLE 2

6α-fluoro-17α-methyl-3,17β-dihydroxy-5β-androstanes (IVA)

A suspension of 0.2 gram of 6α-fluoro-17α-methyl-17β-hydroxy-5β-androstan-3-one in ten milliliters of 95 percent ethyl alcohol is stirred with a solution of 100 milligrams of sodium borohydride in two milliliters of one-tenth normal aqueous sodium hydroxide solution. After stirring for ten minutes the mixture is diluted with water and dilute aqueous acetic acid is added until a pH of six is reached. The product which precipitates is removed by filtration, washed with water, and dried in vacuo to give 6α-fluoro-17α-methyl-3α,17β-dihydroxy - 5β-androstane, a crystalline solid. 6α-fluoro-17α-methyl-3β,17β-dihydroxy-5β-androstane is present in the mother liquor and is isolated by chromatography and further crystallization.

Similarly, the 17-acylates of 6α-fluoro-17α-methyl-17β-hydroxy-5β-androstan-3-one, and other 6α-fluoro-17α-alkyl - 17β - hydroxy-5β-androstan-3-ones and the 17-acylates thereof, can be substituted for 6α-fluoro-17α-methyl-17β-hydroxy-5β-androstan-3-one to obtain the 17-acylates of 6α-fluoro-17α-methyl-3α,17β-dihydroxy-5β-androstane (and the 3β-epimers thereof), and other 6α-fluoro - 17α - alkyl-17β-hydroxy-3α,17β-dihydroxy-5β-androstanes and the 17-acylates thereof (and the 3β-epimers thereof).

EXAMPLE 3

6α-fluoro-17α-methyl-3,17β-dihydroxy-5α-androstanes (IVA)

A suspension of 0.2 gram of 6α-fluoro-17α-methyl-17β-hydroxy-5α-androstan-3-one in ten milliliters of 95 percent ethyl alcohol is stirred with a solution of 100 milligrams of sodium borohydride in two milliliters of one-tenth normal aqueous sodium hydroxide solution. After stirring for ten minutes the mixture is diluted with water and dilute aqueous acetic acid is added until a pH of six is reached. The product which precipitates is removed by filtration, washed with water, and dried in vacuo to give 6α-fluoro - 17α - methyl-3β,17β-dihydroxy-5α-androstane, a crystalline solid. 6α-fluoro-17α-methyl-3α,17β-dihydroxy-5α-androstane is present in the mother liquors and is isolated by chromatography and further crystallization.

Similarly, the 17-acylates of 6α-fluoro-17α-methyl-5α-androstan-3-one, and other 6α-fluoro-17α-alkyl-5α-androstan-3-ones and the 17-acylates thereof can be substituted for 6α-fluoro-17α-methyl-17β-hydroxy-5α-androstan-3-one to obtain the 17-acylates of 6α-fluoro-17α-methyl-3β,17β-dihydroxy-5α-androstane (and the 3α-epimers thereof), and other 6α-fluoro-17α-alkyl-3β,17β-dihydroxy-5α-androstanes and the 17-acylates thereof (and the 3α-epimers thereof).

EXAMPLE 4

6α-fluoro-17α-methyl-17β-hydroxy-19-norandrostan-3-ones (IIIA)

Substituting 6α-fluoro-17α-methyl-17β-hydroxy-19-nor-4-androsten-3-one for 6α-fluoro-17α-methyl-17β-hydroxy-4-androsten-3-one and following the procedure of Example 1 is productive of 6α-fluoro-17α-methyl-17β-hydroxy-19-nor-5β-androstan-3-one and 6α-fluoro-17α-methyl-17β-hydroxy-19-nor-5α-androstan-3-one.

Similarly, substituting other 6α-fluoro-17α-alkyl-17β-hydroxy-19-nor-4-androsten-3-ones, for example, 6α-fluoro-17α-ethyl-17β-hydroxy-19-nor-4-androsten-3-one, for 6α-fluoro-17α-methyl-17β-hydroxy-4-androsten-3-one and following the procedure of Example 1 is productive of other 6α-fluoro-17α-alkyl-17β-hydroxy-19-nor-5β-androstan-3-ones and 6α-fluoro-17α-alkyl-17β-hydroxy-19-nor-5α-androstan-3-ones, for example, 6α-fluoro-17α-ethyl-17β-hydroxy-19-nor-5β-androstan-3-one and 6α-fluoro-17α-ethyl-17β-hydroxy-19-nor-5α-androstan-3-one.

Likewise, substituting 6α-fluoro-17α-methyl-17β-hydroxy-19-nor-4-androsten-3-one 17-acylates and other 6α-fluoro - 17α - alkyl - 17β - hydroxy - 19 - nor - 4 - androsten 3-one 17-acylates in the procedure of Example 1 is productive of 6α-fluoro-17α-methyl-17β-hydroxy-19-nor-5α-androstan-3-one 17-acylates (and the 5β-epimers thereof, and other 6α-fluoro-17α-alkyl-17β-hydroxy-19-nor-5α-androstan-3-one 17-acylates (and the 5β-epimers thereof.) Representative of the 17-acylates thus produced are those named above in Example 1.

EXAMPLE 5

6α-fluoro-17α-methyl-3,17β-dihydroxy-19-nor-5β-androstanes (IVA)

Substituting 6α-fluoro-17α-methyl-17β-hydroxy-19-nor-5β-androstan-3-one for 6α-fluoro-17α-methyl-17β-hydroxy-5β-androstan-3-one and following the procedure of Example 2 is productive of 6α-fluoro-17α-methyl-3α,17β-dihydroxy-19-nor-5β-androstane and 6α-fluoro-17α-methyl-3β,17β-dihydroxy-19-nor-5β-androstane.

Similarly, the substitution of the 17-acylates of 6α-fluoro - 17α - methyl - 17β - hydroxy - 19 - nor - 5β-androstan-3-one and other 6α-fluoro-17α-alkyl-17β-hydroxy-19-nor-5β-androstan-3-ones and the 17-acylates thereof for 6α-fluoro-17α-methyl-17β-hydroxy-5β-androstan-3-one in the procedure of Example 2 is productive of the 17-acylates of 6α-fluoro-17α-methyl-3α,17β-dihydroxy-19-nor-5β-androstane (and the 3β-epimers thereof), and other 6α - fluoro - 17α - alkyl - 3α,17β - dihydroxy - 19 - nor - 5β-androstanes and the 17-acylates thereof (and the 3β-epimers thereof).

EXAMPLE 6

*6α-fluoro-17α-methyl-3,17β-dihydroxy-19-nor-5α-androstanes (IVA)*

Substituting 6α-fluoro-17α-methyl-17β-hydroxy-19-nor-5α-androstan-3-one for 6α-fluoro-17α-methyl-17β-hydroxy-5α-androstan-3-one and following the procedure of Example 3 is productive of 6α-fluoro-17α-methyl-3β,17β-dihydroxy-19-nor-5α-androstane and 6α-fluoro-17α-methyl-3α,17β-dihydroxy-19-nor-5α-androstane.

Similarly, the substitution of the 17-acylates of 6α-fluoro - 17α - methyl - 17β - hydroxy - 19 - nor - 5α - androstan-3-one and other 6α-fluoro-17α-alkyl-17β-hydroxy-19-nor-5α-androstan-3-ones and the 17-acylates thereof for 6α-fluoro-17α-methyl-17β-hydroxy-5α-androstan-3-one in the procedure of Example 1 is productive of the 17-acylates of 6α-fluoro-17α-methyl-3β,17β-dihydroxy-19-nor-5α-androstane (and the 3α-androstane thereof), and other 6α - fluoro - 17α - alkyl - 3β,17β - dihydroxy - 19 - nor - 5α-androstanes and the 17-acylates thereof (and the 3α-epimers thereof).

EXAMPLE 7

*The 6β-fluoro epimers*

A. Substituting 6β-fluoro-17α-methyl-17β-hydroxy-4-androsten-3-one (and the corresponding 19-nor compound) and 6α-fluoro-17α-methyl-17β-hydroxy-4-androsten-3-one and following the procedure of Example 1, there is produced 6β-fluoro-17α-methyl-17β-hydroxy-5β-androstan-3-one (and the corresponding 19-nor compounds) and 6β-fluoro-17α-methyl-17β-hydroxy-5α-androstan-3-one (and the corresponding 19-nor compound).

In like manner, the 17-acylates of 6β-fluoro-17α-methyl-17β-hydroxy-4-androsten-3-one (and the corresponding 19-nor compounds) are converted to 6β-fluoro-17α-methyl-17β-hydroxy-5β-androstan-3-one 17-acylates (and the corresponding 19-nor compounds), and 6β-fluoro-17α-methyl-17β-hydroxy-5α-androstan-3-one 17-acylates (and the corresponding 19-nor compounds).

B. Substituting 6β-fluoro-17α-methyl-17β-hydroxy-5β-androstan-3-one (and the corresponding 19-nor compound) for 6α-fluoro-17α-methyl-17β-hydroxy-5β-androstan-3-one and following the procedure of Example 2 there is produced 6β-fluroro-17α-methyl-3α,17β-dihydroxy-5β-androstane (and the corresponding 19-nor compound) and 6β-fluoro-17α-methyl-3β,17β-dihydroxy-5β-androstane (and the corresponding 19-nor compound).

In like manner, the 17-acylates of 6β-fluoro-17α-methyl-17β-hydroxy-5β-androstan-3-one (and the corresponding 19-nor compounds) are converted to 6β-fluoro-17α-methyl - 17β - hydroxy - 3α,17β - dihydroxy - 5β - androstane 17-acylates (and the corresponding 19-nor compounds) and 6β-fluoro-17α-methyl-3β,17β-dihydroxy-5β-androstane 17-acylates (and the corresponding 19-nor compounds).

C. Substituting 6β-fluoro-17α-methyl-17β-hydroxy-5α-androstan-3-one (and the corresponding 19-nor compound) for 6α-fluoro-17α-methyl-5α-androstan-3-one and following the procedure of Example 3 there is produced 6β-fluoro-17α-methyl-3β,17β-dihydroxy-5α-androstane (and the corresponding 19-nor compound), and 6β-fluoro-17α-methyl-3α,17β-dihydroxy-5α-androstane (and the corresponding 19-nor compound).

In like manner, the 17-acylates of 6β-fluoro-17α-methyl-17β-hydroxy-5α-androstan-3-one (and the corresponding 19-nor compounds) are converted to 6β-fluoro-17α-methyl-3β,17β-dihydroxy-5α-androstane 17-acylates (and the corresponding 19-nor compounds); and 6β-fluoro-17α-methyl-3α,17β - dihydroxy - 5α - androstane 17-acylates (and the corresponding 19-nor compounds).

EXAMPLE 8

*6α-fluoro-17β-hydroxyandrostan-3-ones (IIIB)*

A mixture containing five grams of 6α-fluoro-17β-hydroxy-4-androsten-3-one, 250 milliliters of isopropyl alcohol and 0.5 gram of five percent palladium on charcoal is hydrogenated at fifteen pounds per square inch gauge. The reaction mixture thus obtained is filtered and concentrated to dryness, leaving a residue. The residue is taken up in twenty-five milliliters of methylene chloride and chromatographed over 250 grams of Florisil (synthetic magnesium silicate). The chromatographic column is eluted with Skellysolve B hexanes containing increasing proportions of acetone. The eluates, obtained in fractions from the chromatographic column, are evaporated to dryness to give residues. The crystalline residues obtained from the fractions eluted with Skellysolve B hexanes containing five to eight percent acetone are combined and recrystallized from ether-Skellysolve B hexanes to give 6α-fluoro-17β-hydroxy-5α-androstan-3-one, a crystalline solid having a melting point of 161–163° C. 6α-fluoro-17β-hydroxy-5β-androstan-3-one is present in the mother liquors and is obtained by further fractional crystallization.

Alternatively, the two isomers can be separated by reaction of the crude residue mixture from the hydrogenation with three milliliters of pyrrolidine in 25 milliliters of methanol at reflux temperature and under an atmosphere of nitrogen for about two minutes. The 3-pyrrolidyl enamines of the 5α and 5β compounds thus formed are then separated by crystallization. The first crop of crystals of the 3-pyrrolidyl enamine which forms is removed, and is dissolved by adding thereto 200 milliliters of methanol containing ten milliliters of ten percent sodium hydroxide solution and warming under a nitrogen atmosphere at approximately fifty degrees centigrade for about twenty minutes. The mother liquor, containing the remaining 3-pyrrolidyl enamine, which is left following removal of the first crop of crystals, has added thereto 175 milliliters of methanol containing ten milliliters of ten percent sodium hydroxide solution followed by warming at approximately fifty degrees centigrade under a nitrogen atmosphere for about twenty minutes. The solutions are then cooled, neutralized with acetic acid and concentrated to near dryness under reduced pressure. The residues thus obtained are extracted with ether and the ether extract is washed, dried, and evaporated to dryness. Crystallizations from acetone-Skellysolve B hexanes give the pure 5α and 5β isomers, 6α-fluoro-17β-hydroxy-5α-androstan-3-one and 6α-fluoro-17β-hydroxy-5β-androstan-3-one, respectively.

Similarly, substituting 6α-fluoro-17β-hydroxy-4-androsten-3-one 17-acylates for 6α-fluoro-17β-hydroxy-4-androsten-3-one is productive of 6α-fluoro-17β-hydroxy-5α-androstan-3-one 17-acylates (and the 5β-epimers thereof). Representative of the 17-acylates thus produced are the 17-acetate, 17-propionate, 17-butyrate, 17-valerate, 17-hexanoate, 17-laurate, 17-trimethylacetate, 17-isobutyrate, 17-isovalerate, 17-cyclohexane-carboxylate, 17-benzoate, 17-phenylacetate, 17-(β-phenylpropionate), 17-(o-, m-, p-toluate), 17-hemisuccinate, and 17-hemiadipate.

EXAMPLE 9

*6α-fluoro-3,17β-dihydroxy-5α-androstanes (IVB)*

To a solution of one gram of 6α-fluoro-17β-hydroxy-5α-androstan-3-one in fifty milliliters of methanol, chilled to about five degrees centigrade, there is added a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β,17β-dihydroxy-5α-androstane and 6α-fluoro-3α,17β-dihydroxy-5α-androstane together with a small amount of unchanged starting material. The crude product is then dissolved in methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-3β,17β-dihydroxy-5α-androstane, a crystalline solid, and 6α-fluoro-3α,17β-dihydroxy-5α-androstane, a crystalline solid, both of which can be further purified by recrystallization from acetone-hexane mixture.

Similarly substituting 6α-fluoro-17β-hydroxy-5α-androstan-3-one 17-acylates for 6α-fluoro-17β-hydroxy-5α-androstan-3-one is productive of 6α-fluoro-3β,17β-dihydroxy-5α-androstane 17-acylates and 6α-fluoro-3α,17β-dihydroxy-5α-androstane 17-acylates.

In like manner substituting 6α-fluoro-17β-hydroxy-5β-androstan-3-one (and the 17-acylates thereof) for 6α-fluoro-17β-hydroxy-5α-androstan-3-one is productive of 6α-fluoro-3α,17β-dihydroxy-5β-androstane (and the 17-acylates thereof) and 6α-fluoro-3β,17β-dihydroxy-5β-androstane (and the 17-acylates thereof).

EXAMPLE 10

*6α-fluoro-17β-hydroxyandrostane-3,11-diones (IIIB)*

A mixture containing one gram of 6α-fluoro-17β-hydroxy-4-androstene-3,11-dione, fifty milliliters of isopropyl alcohol and 200 milligrams of five percent palladium on charcoal is hydrogenated at fifteen pounds per square inch gauge. The reaction mixture thus obtained is filtered and concentrated to dryness, leaving a residue. The residue is taken up in twenty milliliters of methylene chloride and chromatographed over fifty grams of Florisil (synthetic magnesium silicate). The chromatographic column is eluted with Skellysolve B hexanes containing increasing proportions of acetone to give, after removal of the eluant, 6α-fluoro-17β-hydroxy-5β-androstane-3,11-dione, a crystalline solid, and 6α-fluoro-17β-hydroxy-5α-androstane-3,11-dione, a crystalline solid, both of which can be further purified by recrystallization from acetone-hexane mixture.

Alternatively, the 5α- and 5β-epimers are separated by following the pyrrolidyl enamine procedure disclosed in Example 8.

Similarly substituting 6α-fluoro-17β-hydroxy-4-androstene-3,11-dione 17-acylates for 6α-fluoro-17β-hydroxy-4-androstene-3,11-dione is productive of 6α-fluoro-17β-hydroxy-5α-androstane-3,11-dione 17-acylates (and the 5β-epimers thereof). Representative of the 17-acylates thus produced are those named in Example 8.

EXAMPLE 11

*6α-fluoro-3,17β-dihydroxy-5α-androstan-11-ones (IVB)*

To a solution of one gram of 6α-fluoro-17β-hydroxy-5α-androstane-3,11-dione in fifty milliliters of methanol, chilled to about five degrees centigrade, there is added a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β,17β-dihydroxy-5α-androstan-11-one and 6α-fluoro-3α,17β-dihydroxy-5α-androstan-11-one together with a small amount of unchanged starting material. The crude product is then dissolved in methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-3β,17β-dihydroxy-5α-androstan-11-one, a crystalline solid, and 6α-fluoro-3α,17β-dihydroxy-5α-androstan-11-one, a crystalline solid, both of which can be further purified by recrystallization from acetone-hexane mixture.

Similarly, substituting 6α-fluoro-17β-hydroxy-5α-androstane-3,11-dione 17-acylates for 6α-fluoro-17β-hydroxy-5α-androstane-3,11-dione is productive of 6α-fluoro-3α,17β-dihydroxy-5α-androstan-11-one 17-acylates and 6α-fluoro-3α,17β-dihydroxy-5α-androstan-11-one 17-acylates.

In like manner, substituting 6α-fluoro-17β-hydroxy-5β-androstane-3,11-dione (and the 17-acylates thereof) for 6α-fluoro-17β-hydroxy-5α-androstane-3,11-dione is productive of 6α-fluoro-3α,17β-dihydroxy-5β-androstan-11-one (and the 17-acylates thereof) and 6α-fluoro-3β,17β-dihydroxy-5β-androstan-11-one (and the 17-acylates thereof).

EXAMPLE 12

*6α-fluoro-11β,17β-dihydroxyandrostan-3-ones (IIIB)*

A mixture containing five grams of 6α-fluoro-11β,17β-dihydroxy-4-androsten-4-one, 250 milliliters of isopropyl alcohol and one gram of five precent palladium on charcoal is hydrogenated at fifteen pounds per square inch gauge. The reaction mixture thus obtained is filtered and concentrated to dryness, leaving a residue. The residue is taken up in 25 milliliters of methylene chloride and chromatographed over 250 grams of Florisil (synthetic magnesium silicate). The chromatographic column is eluated with Skellysolve B hexanes containing increasing proportions of acetone to give, after removal of the eluant, 6α-fluoro-11β,17β-dihydroxy-5β-androstan-3-one, a crystalline solid, and 6α-fluoro-11β,17β-dihydroxy-5α-androstan-3-one, a crystalline solid, both of which can be further purified by recrystallization from acetone-hexane mixture.

Alternatively, the 5α- and 5β-epimers are separated by following the pyrrolidyl enamine procedure disclosed in Example 8.

Similarly substituting 6α-fluoro-11β,17β-dihydroxy-4-androsten-3-one 17-acylates for 6α-fluoro-11β,17β-dihydroxy-4-androsten-3-one is productive of 6α-fluoro-11β,17β-dihydroxy-5α-androstan-3-one 17-acylates (and the 5β-epimers thereof). Representative of the 17-acylates thus produced are those named in Example 8.

EXAMPLE 13

*6α-fluoro-3,11β,17β-trihydroxy-5α-androstanes (IVB)*

To a solution of one gram of 6α-fluoro-11β,17β-dihydroxy-5α-androstan-3-one in fifty milliliters of methanol, chilled to about five degrees centigrade, there is added a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β,11β,17β-trihydroxy-5α-androstane and 6α-fluoro-3α,11β,17β-trihydroxy-5α-androstane, together with a small amount of unchanged starting material. The crude product is then dissolved in methylene chloride and chromatographed over 100 grams of Florisil (synthetic magnesium silicate). The chromatographic column is eluated with Skellysolve B hexanes containing increasing proportions of acetone to give, after removal of the eluant, 6α-fluoro-3β,11β,17β-trihydroxy-5α-androstane, a crystalline solid, and 6α-fluoro-3α,11β,17β-trihydroxy-5α-androstane, a crystalline solid, both of which can be further purified by recrystallization from acetone-hexane mixture.

Similarly, substituting 6α-fluoro-11β,17β-dihydroxy-5α-androstan-3-one 17-acylates for 6α-fluoro-11β,17β-dihydroxy-5α-androstan-3-one is productive of 6α-fluoro-3β,11β,17β-trihydroxy-5α-androstane 17-acylates and 6α-fluoro-3α-11β,17β-trihydroxy-5α-androstane 17-acylates.

In like manner, substituting 6α-fluoro-11β,17β-dihydroxy-5β-androstan-3-one (and the 17-acylates thereof) for 6α-fluoro-11β,17β-dihydroxy-5α-androstan-3-one is productive of 6α-fluoro-3α,11β,17β-trihydroxy-5β-androstane (and the 17-acylates thereof) and 6α-fluoro-3β,11β,17β-trihydroxy-5β-androstane (and the 17-acylates thereof).

EXAMPLE 14

6α-fluoroandrostane-3,17-diones (IIIB)

A mixture containing two grams of 6α-fluoro-4-androstene-3,17-dione, 100 milliliters of isopropyl alcohol and 0.4 gram of five percent palladium on charcoal is hydrogenated at fifteen pounds per square inch gauge. The reaction mixture thus obtained is filtered and concentrated to dryness, leaving a residue. The residue is taken up in fifteen milliliters of methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-5β-androstane-3,17-dione, a crystalline solid, and 6α-fluoro-5α-androstane-3,17-dione, a crystalline solid, both of which can be further purified by recrystallization from acetone-hexane mixture.

Alternatively, the 5α- and 5β-epimers are separated by following the pyrrolidyl enamine procedure disclosed in Example 8.

EXAMPLE 15

6α-fluoro-3-hydroxy-5α-androstan-17-ones (IVB)

To a solution of one gram of 6α-fluoro-5α-androstane-3,17-dione in fifty milliliters of methanol, chilled to about five degrees centigrade, there is added a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β-hydroxy-5α-androstan-17-one and 6α-fluoro-3α-hydroxy-5α-androstan-17-one, together with a small amount of unchanged starting material. The crude product is then dissolved in methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-3β-hydroxy-5α-androstan-17-one, a crystalline solid, and 6α-fluoro-3α hydroxy-5α-androstan-17-one, a crystalline solid, both of which can be further purified by recrystallization from acetone-hexane mixture.

In like manner, substituting 6α-fluoro-5β-androstane-3,17-dione for 6α-fluoro-5α-androstane-3,17-dione is productive of 6α-fluoro-3α-hydroxy-5β-androstan-17-one and 6α-fluoro-3β-hydroxy-5β-androstan-17-one.

EXAMPLE 16

6α-fluoroandrostane-3,11,17-trione (IIIB)

A mixture containing five grams of 6α-fluoro-4-androstene-3,11,17-trione, 250 milliliters of isopropyl alcohol and one gram of five percent palladium on charcoal is hydrogenated at fifteen pounds per square inch gauge. The reaction mixture thus obtained is filtered and concentrated to dryness, leaving a residue. The residue is taken up in forty milliliters of methylene chloride and chromatographed over 200 grams of Florisil (synthetic magnesium silicate). The chromatographed column is eluted with Skellysolve B hexanes containing increasing proportions of acetone to give, after removal of the eluant, 6α-fluoro-5β-androstane-3,11,17-trione, a crystalline solid, and 6α-fluoro-5α-androstane-3,11,17-trione, a crystalline solid, both of which can be further purified by recrystallization from acetone-hexane mixture.

Alternatively, the 5α- and 5β-epimers are separated by following the pyrrolidyl enamine procedure disclosed in Example 8.

EXAMPLE 17

6α-fluoro-3-hydroxy-5α-androstane-11,17-diones (IVB)

To a solution of one gram of 6α-fluoro-5α-androstane-3,11,17-trione in fifty milliliters of methanol, chilled to about five degrees centigrade, there is added a solution of 57 milligrams of potassium borohydride is one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β-hydroxy-5α-androstane-11,17-dione and 6α-fluoro-3α-hydroxy-5α-androstane-11,17-dione, together with a small amount of unchanged starting material. The crude product is then dissolved in methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-3β-hydroxy-5α-androstane-11,17-dione, a crystalline solid, and 6α-fluoro-3α-hydroxy-5α-androstane-11,17-dione, a crystalline solid, both of which can be further purified by recrystallization from acetone-hexane mixture.

In like manner, substituting 6α-fluoro-5β-androstane-3,11,17-trione for 6α-fluoro-5α-androstane-3,11,17-trione is productive of 6α-fluoro-3α-hydroxy-5α-androstane-11,17-dione and 6α-fluoro-3β-hydroxy-5β-androstane-11,17-dione.

EXAMPLE 18

6α-fluoro-11β-hydroxyandrostane-3,17-dione (IIIB)

A mixture containing ten grams of 6α-fluoro-11β-hydroxy-4-androstene-3,17-dione, 500 milliliters of isopropyl alcohol and two grams of five percent palladium on charcoal is hydrogenated at fifteen pounds per square inch gauge. The reaction mixture thus obtained is filtered and concentrated to dryness, leaving a residue. The residue is taken up in fifty milliliters of methylene chloride and chromatographed over 300 grams of Florisil (synthetic magnesium silicate). The chromatographic column is eluted with Skellysolve B hexanes containing increasing proportions of acetone to give, after removal of the eluant, 6α-fluoro-11β-hydroxy-5β-androstane-3,17-dione, a crystalline solid, and 6α-fluoro-11β-hydroxy-5α-androstane-3,17-dione, a crystalline solid, both of which can be further purified by recrystallization from acetone-hexane mixture.

Alternatively, the 5α- and 5β-epimers are separated by following the pyrrolidyl enamine procedure disclosed in Example 8.

EXAMPLE 19

6α-fluoro-3,11β-dihydroxy-5α-androstan-17-ones (IVB)

To a solution of one gram of 6α-fluoro-11β-hydroxy-5α-androstane-3,17-dione in fifty milliliters of methanol, chilled to about five degrees centigrade, there is added a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-3β,11β-dihydroxy-5α-androstan-17-one and 6α-fluoro-3α,11β-dihydroxy-5α-androstan-17-one, together with a small amount of unreacted starting material. The crude product is then dissolved in methylene chloride and chromatographed over 100 grams of Florisil (synthetic magnesium silicate). The chromatographic column is eluted with Skellysolve B hexanes containing increasing proportions of acetone to give, after removal of the eluant, 6α-fluoro-3β,11β-dihydroxy-5α-androstan-3-one, a crystalline solid, and 6α-fluoro-3α,11β-dihydroxy-5α-androstan-3-one, a crystalline solid, both of which can be further purified by recrystallization from acetone-hexane mixture.

In like manner, substituting 6α-fluoro-11β-hydroxy-5β- androstane-3,17-dione for 6α-fluoro-11β-hydroxy-5α-androstane-3,17-dione is productive of 6α-fluoro-3α,11β-dihydroxy-5β-androstan-17-one and 6α-fluoro-3β,11β-dihydroxy-5β-androstan-17-one.

EXAMPLE 20

*The 6α-fluoro-19-nor steroids*

Substituting the corresponding 6α-fluoro-19-nor starting steriods in each example and following the procedures of Example 8 through 19 there are obtained the corresponding 6α-fluoro-19-nor end products of each example, e.g., 6α - fluoro - 17β - hydroxy - 19 - nor - 5β - androstane-3-one, 6α-fluoro-17β-hydroxy-19-nor-5α-androstan-3-one, and the 17-acylates thereof, (Example 8), 6α-fluoro-3β, 17β - dihydroxy - 19 - nor - 5α - androstane, 6α - fluoro- 3α,17β - dihydroxy - 19 - nor - 5α - androstane, 6α-fluoro - 3α,17β - dihydroxy - 19 - nor - 5β - androstane, 6α - fluoro - 3β,17β - dihydroxy - 19 - nor - 5β - androstane, and the 17-acylates thereof, (Example 9), 6α-fluoro-17β - hydroxy - 19 - nor - 5β - androstane - 3,11 - dione, 6α - fluoro - 17β - hydroxy - 19 - nor - 5α - androstane-3,11-dione, and the 17-acylates thereof (Example 10), 6α-fluoro - 3β,17β - dihydroxy - 19 - nor - 5α - androstan-11 - one, 6α - fluoro - 3α,17β - dihydroxy - 19 - nor - 5α-androstan - 11 - one, 6α - fluoro - 3α,17β - dihydroxy - 19-nor - 5β - androstan - 11 - one, 6α - fluoro - 3β,17β - dihydroxy - 19 - nor - 5β - androstan - 11 - one, and the 17-acylates thereof (Example 11), 6α-fluoro-11β,17β-dihydroxy - 19 - nor - 5α - androstan - 3 - one, 6α - fluoro- 11β,17β - dihydroxy - 19 - nor - 5β - androstan - 3 - one, and the 17-acylates thereof (Example 12), 6α-fluoro-3β,11β,17β - trihydroxy - 19 - nor - 5α - androstane, 6α-fluoro - 3α,11β,17β - trihydroxy - 19 - nor - 5α - androstane, 6α - fluoro - 3α,11β,17β - trihydroxy - 19 - nor - 5β-androstane, 6α - fluoro - 3β,11β,17β - trihydroxy - 19-nor-5β-androstane, and the 17-acylates thereof, (Example 13), 6α - fluoro - 19 - nor - 5α - androstane - 3,17 - dione, 6α - fluoro - 19 - nor - 5β - androstane - 3,17 - dione (Example 14), 6α - fluoro - 3β - hydroxy - 19 - nor - 5α - androstan - 17 - one, 6α - fluoro - 3α - hydroxy - 19 - nor-5α - androstan - 17 - one, 6α - fluoro - 3α - hydroxy-19 - nor - 5β - androstan - 17 - one, 6α - fluoro - 3β - hydroxy - 19 - nor - 5β - androstan - 17 - one (Example 15), 6α - fluoro - 19 - nor - 5α - androstane - 3,11,17 - trione, 6α - fluoro - 19 - nor - 5β - androstane - 3,11,17 - trione (Example 16), 6α - fluoro - 3β - hydroxy - 19 - nor - 5α-androstane - 11,17 - dione, 6α - fluoro - 3α - hydroxy - 19-nor - 5α - androstane - 11,17 - dione, 6α - fluoro - 3α-hydroxy - 19 - nor - 5β - androstane - 11,17 - dione, 6α - fluoro - 3β - hydroxy - 19 - nor - 5β - androstane-11,17 - dione (Example 17), 6α - fluoro - 11β - hydroxy-19 - nor - 5α - androstane - 3,17 - dione, 6α - fluoro - 11β-hydroxy - 19 - nor - 5β - androstane - 3,17 - dione (Example 18), 6α - fluoro - 3β,11β - dihydroxy - 19 - nor-5α - androstan - 17 - one, 6α - fluoro - 3α,11β - dihydroxy-19 - nor - 5α - androstan - 17 - one, 6α - fluoro - 3α,11β-dihydroxy - 19 - nor - 5β - androstan - 17 - one, and 6α-fluoro - 3β,11β - dihydroxy - 19 - nor - 5β - androstan-17-one (Example 19).

EXAMPLE 21

*The 6β-fluoro epimers*

Substituting 6β - fluoro - 17β - hydroxy - 4 androsten-3 -one for 6α - fluoro - 17β - hydroxy - 4 - androsten - 3-one and following the procedure of Example 8, there is produced 6β - fluoro - 17β - hydroxy - 5β - androstan - 3-one and 6β-fluoro-17β-hydroxy-5α-androstan-3-one.

Likewise, substituting the corresponding 6β-fluoro and 6β-fluoro-19-nor steroids for the starting compounds of Examples 9 through 20 and following the procedures described therein, there are obtained the corresponding 6β-fluoro and 6β-fluoro-19-nor end products of each example.

This application is a continuation-in-part of application Serial No. 740,570, now abandoned, and application Serial No. 740,529, both filed June 9, 1958. Application Serial No. 740,570 is, in turn, a continuation-in-part of application Serial No. 699,502, filed November 29, 1957, now U.S. Patent 2,838,500, issued June 10, 1958. Application Serial No. 740,529 is, in turn, a continuation-in-part of application Serial No. 716,026, filed February 19, 1958, now U.S. Patent 2,838,492, issued June 10, 1958, which is, in turn, a continuation-in-part of application Serial No. 699,505, filed November 29, 1957, now abandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro compound of the formula:

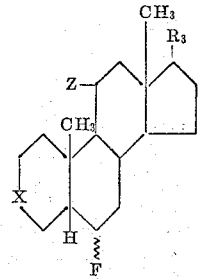

wherein $R_3$ is selected from the group consisting of hydroxyl, OAcyl, and keto, the term Acyl representing the acyl radical of an organic carboxylic acid containing from one to twelve carbon atoms, inclusive, X is selected from the group consisting of the carbonyl radical and the hydroxymethylene radical, and Z is selected from the group consisting of hydrogen, hydroxyl, and keto.

2. 6α-fluoro-17β-hydroxy-5α-androstan-3-one.
3. 6α-fluoro-17β-hydroxy-5α-androstane-3,11-dione.
4. 6α-fluoro-11β,17β-dihydroxy-5α-androstan-3-one.
5. 6α-fluoro-5α-androstane-3,17-dione.
6. 6α-fluoro-5α-androstane-3,11,17-trione.
7. 6α-fluoro-11β-hydroxy-5α-androstane-3,17-dione.
8. 6α-fluoro-3β,17β-dihydroxy-5α-androstane.
9. 6α-fluoro-3β,17β-dihydroxy-5α-androstan-11-one.
10. 6α-fluoro-3β,11β,17β-trihydroxy-5α-androstane.
11. 6α-fluoro-3β-hydroxy-5α-androstan-17-one.
12. 6α-fluoro-3β-hydroxy-5α-androstane-11,17-dione.
13. 6α-fluoro-3β,11β-dihydroxy-5α-androstan-17-one.
14. A 6-fluoro compound of the formula:

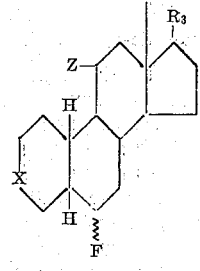

wherein $R_3$ is selected from the group consisting of hydroxyl, OAcyl, and keto, the term Acyl representing the acyl radical of an organic carboxylic acid containing from one to twelve carbon atoms, inclusive, X is selected from the group consisting of the carbonyl radical and the hydroxymethylene radical, and Z is selected from the group consisting of hydrogen, hydroxyl, and keto.

References Cited in the file of this patent

UNITED STATES PATENTS 2,839,500     Campbell et al. _____ June 10, 1958

UNITED STATES PATENT OFFICE
CERTIFICATION OF CORRECTION

Patent No. 3,016,387

January 9, 1962

John C. Babcock et al.

It is hereby certified that error appears in the above numbered patent requiring correction and that the said Letters Patent should read as corrected below.

Column 2, lines 33 to 43, formula IVA should appear as shown below instead of as in the patent:

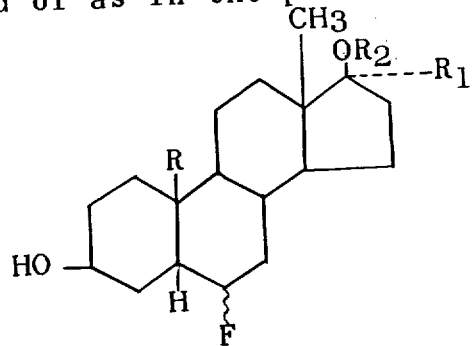

column 3, lines 59 to 69, formula IB should appear as shown below instead of as in the patent:

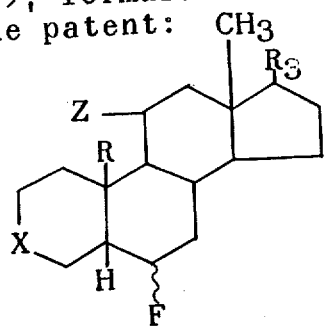

column 4, line 72, for "-11β,7β-" read -- -11β,17β- --; column 5, line 74, for "17-acelates" read -- 17-acylates --; column 8, line 30, for "4-androsten.3-one" read -- 4-androsten-3-one --; column 9, lines 27 and 28, for "compound) and" read -- compound) for --; column 11, line 75, for "-3α,17β-" read -- -3β,17β- --; column 12, line 14, for "-4-androsten-4-one" read -- -4-androsten-3-one --; column 16, line 73, for "2,839,500" read -- 2,838,500 --.

Signed and sealed this 8th day of May 1962.

(SEAL)
Attest:

ERNEST W. SWIDER
Attesting Officer

DAVID L. LADD
Commissioner of Patents